United States Patent
Kim

(10) Patent No.: US 8,899,666 B1
(45) Date of Patent: Dec. 2, 2014

(54) VEHICLE BODY HAVING REINFORCEMENT STRUCTURE

(71) Applicant: Kia Motors Corporation, Seoul (KR)

(72) Inventor: Sung Won Kim, Whasung-Si (KR)

(73) Assignee: Kia Motors Corporation, Seoul (KR)

( * ) Notice: Subject to any disclaimer, the term of this patent is extended or adjusted under 35 U.S.C. 154(b) by 0 days.

(21) Appl. No.: 14/294,921

(22) Filed: Jun. 3, 2014

(30) Foreign Application Priority Data

Oct. 28, 2013 (KR) .................. 10-2013-0128673

(51) Int. Cl.
   *B62D 25/00* (2006.01)
   *B62D 25/02* (2006.01)
   *B60J 5/04* (2006.01)

(52) U.S. Cl.
   CPC ............... *B62D 25/02* (2013.01); *B60J 5/0443* (2013.01)
   USPC .................................. 296/203.03; 296/193.06

(58) Field of Classification Search
   USPC .............. 296/203.03, 193.06, 187.09, 187.1, 296/146.11
   See application file for complete search history.

(56) References Cited

U.S. PATENT DOCUMENTS

| | | | | |
|---|---|---|---|---|
| 5,586,799 A | * | 12/1996 | Kanemitsu et al. | 296/203.02 |
| 8,382,195 B2 | * | 2/2013 | Iwase et al. | 296/187.12 |
| 8,608,238 B2 | * | 12/2013 | Tanaka et al. | 296/203.03 |

FOREIGN PATENT DOCUMENTS

| | | |
|---|---|---|
| JP | 2009-83790 A | 4/2009 |
| JP | 2010-111140 A | 5/2010 |
| KR | 10-2011-0136124 A | 12/2011 |

* cited by examiner

*Primary Examiner* — Joseph D Pape
(74) *Attorney, Agent, or Firm* — Morgan, Lewis & Bockius LLP

(57) ABSTRACT

A vehicle body having a reinforcement structure includes a side outer panel on an outer side of the vehicle body, a side inner panel on an inner side of the vehicle body at a predetermined distance from the side outer panel, a door hinge box attached to an upper portion of an inner side of the side inner panel, a door lower hinge reinforcement plate attached to a lower portion of the inner side of the side inner panel, vertically at a predetermined distance from the door hinge box, a bulk head attached to an upper end of the door lower reinforcement plate, with one end attached to an inner side of the side outer panel and the other end attached to an outer side of the side inner panel, and a reinforcement bracket disposed in an up-down direction to connect the door hinge box and the bulk head.

6 Claims, 6 Drawing Sheets

A-A

VEHICLE BODY HAVING REINFORCEMENT STRUCTURE

CROSS-REFERENCE TO RELATED APPLICATION

The present application claims priority of Korean Patent Application Number 10-2013-0128673 filed on Oct. 28, 2013, the entire contents of which application are incorporated herein for all purposes by this reference.

BACKGROUND OF INVENTION

1. Field of Invention

The present invention relates to a vehicle body having a reinforcement structure that protects a driver and passengers and improves rigidity and durability of a vehicle body by distributing or uniformly distributing shock energy due to a collision of vehicle.

2. Description of Related Art

In general, some or a lot of shock energy is transmitted to the side structure of a vehicle body in a collision of a vehicle. When shock energy is transmitted to a side structure, doors may be crushed or the spaces for passengers may be crushed.

Accordingly, studies for distributing durability and shock energy of a side structure including an A-pillar on a vehicle body to reduce injuries to passengers due to excessive deformation of weak parts in a small overlap collision of a vehicle have been conducted.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

The present invention has been made in an effort to provide a vehicle body having a reinforcement structure having advantages of distributing rigidity and shock energy of a side structure to reduce injuries to passengers and deformation of the vehicle body in a small overlap collision of the vehicle body.

Various aspects of the present invention provide a vehicle body having a reinforcement structure which may include a side outer panel disposed on an outer side of the vehicle body, a side inner panel disposed on an inner side of the vehicle body at a predetermined distance from the side outer panel, a door hinge box attached to an upper portion of an inner side of the side inner panel, a door lower hinge reinforcement plate attached to a lower portion of the inner side of the side inner panel, vertically at a predetermined distance from the door hinge box, a bulk head attached to an upper end of the door lower reinforcement plate, with one end attached to an inner side of the side outer panel and the other end attached to an outer side of the side inner panel, and a reinforcement bracket disposed in an up-down direction to connect the door hinge box and the bulk head.

The door hinge box may include a door upper hinge bracket attached to the inner side of the outer panel and a door upper hinge reinforcement plate with one end attached to an upper end of the reinforcement bracket and the other end attached to the door upper hinge bracket.

The vehicle body may further include a door hinged to the door hinge box and a door beam disposed in a front-rear direction inside the door and prevents deformation of the door, wherein a front end of the door beam is disposed at a position corresponding to a joint of the reinforcement bracket and the bulk head.

The door lower hinge reinforcement plate may have a shape corresponding to the inner side of the outer panel. A lower end of the reinforcement bracket may be attached and fixed to a center of an upper surface of the bulk head.

The vehicle body may further include a side seal disposed in a front-rear direction on a lower part of the vehicle body, wherein a lower end of the door lower hinge reinforcement plate is attached to the side seal.

According to the vehicle body having a reinforcement structure of the present invention, since shock energy transmitted along the side from the front of a vehicle is distributed to the door upper hinge bracket, the door upper hinge reinforcement plate, the reinforcement bracket, the bulk head, the door lower hinge reinforcement plat, and the side seal, such that passengers are protected and the partial rigidity of the side is increased, and thus the rigidity of the vehicle body can be improved.

Further, it is possible to increase the rigidity of the part supporting a door and it is possible to distribute shock energy and reduce deformation of the vehicle body by distributing the shock energy to the door from the side.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
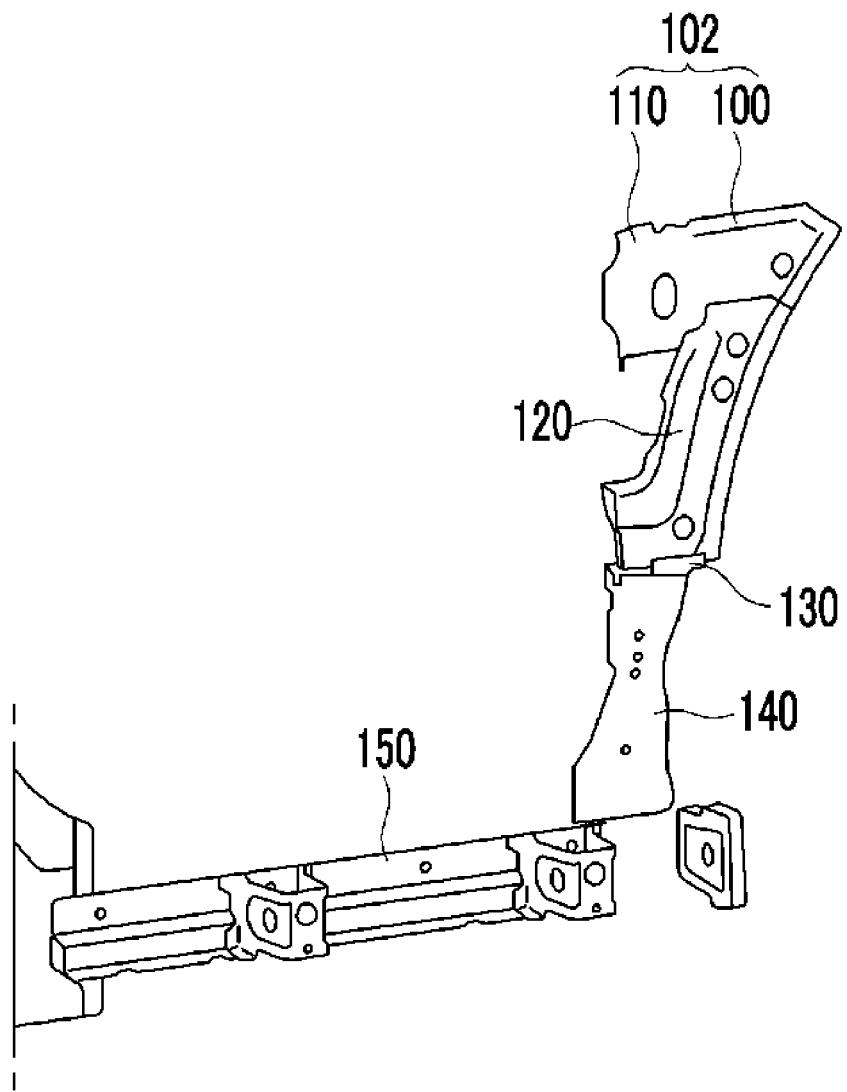
FIG. 1 is a perspective view showing a portion of the inside of an exemplary vehicle body having an exemplary reinforcement structure according to the present invention.
Figure 2:
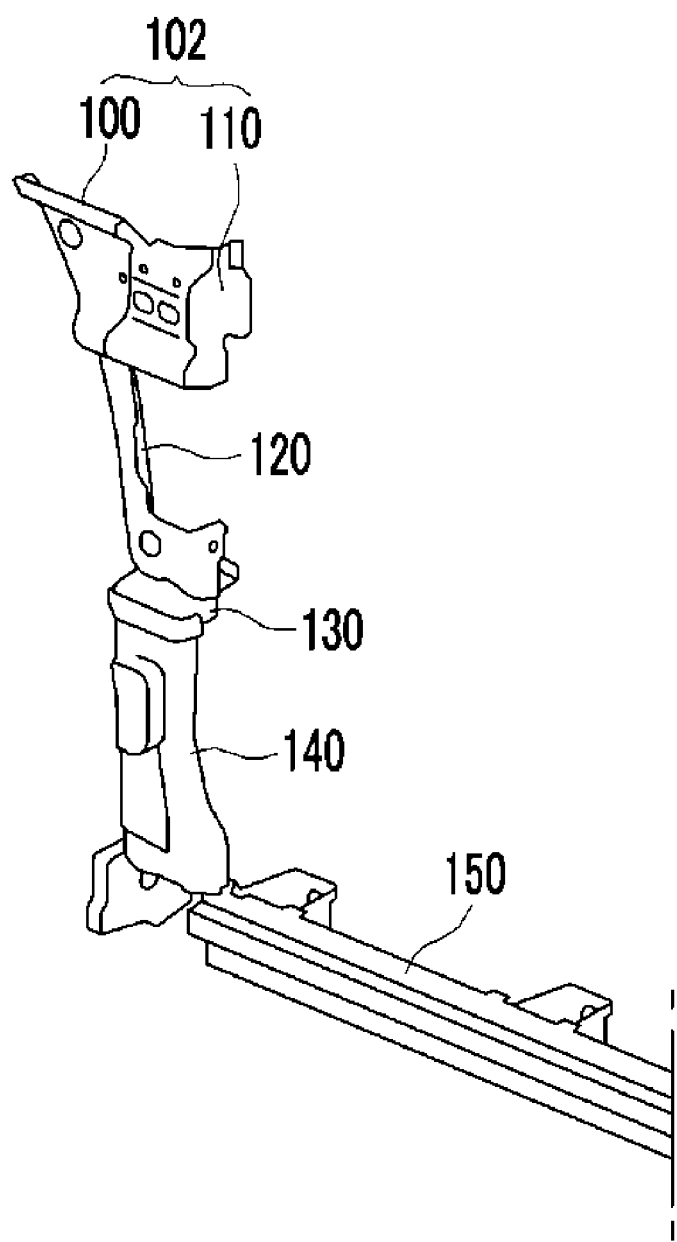
FIG. 2 is a perspective view showing a portion of the outside of an exemplary vehicle body having an exemplary reinforcement structure according to the present invention.

FIG. 1 is a perspective view showing a portion of the inside of a vehicle body having a reinforcement structure and FIG. 2 is a perspective view showing a portion of the outside of the vehicle body having a reinforcement structure according to various embodiments of the present invention. Referring to FIGS. 1 and 2, a vehicle body having a reinforcement structure includes a door upper hinge box 102, a reinforcement bracket 120, a bulk head 130, a door lower hinge reinforcement plate 140, and a side seal 150. The door upper hinge box 102 includes a door upper hinge bracket 110 and a door upper hinge reinforcement plate 100.

The door upper hinge box 102 is a part connected with an upper hinge enabling a door to turn and the door lower hinge reinforcement plate 140 is a part connected with a lower hinge enabling the door to turn.

The door upper hinge bracket 110 is attached to the door upper hinge reinforcement plate 100, the upper end of the reinforcement bracket 120 is attached to the door upper hinge bracket 110 of the door upper hinge box 102, and the lower end of the reinforcement bracket 120 is attached to the center of the upper surface of the bulk head 130.

The upper end of the door lower hinge reinforcement plate 140 is attached to the outer end of the bulk head 130 and the lower end of the door lower hinge reinforcement plate 140 is attached to the side seal 150. The side seal 150 is disposed in the front-rear direction on the lower part of a vehicle body.

According to various embodiments of the present invention, in a front collision of a vehicle, the shock applied to the front of the vehicle is distributed to the door upper hinge box, the reinforcement bracket 120, the bulk head 130, the door lower hinge reinforcement plate 140, and the side seal 150, such that the performance against an offset collision and a small overlap collision can be improved.

Figure 3:
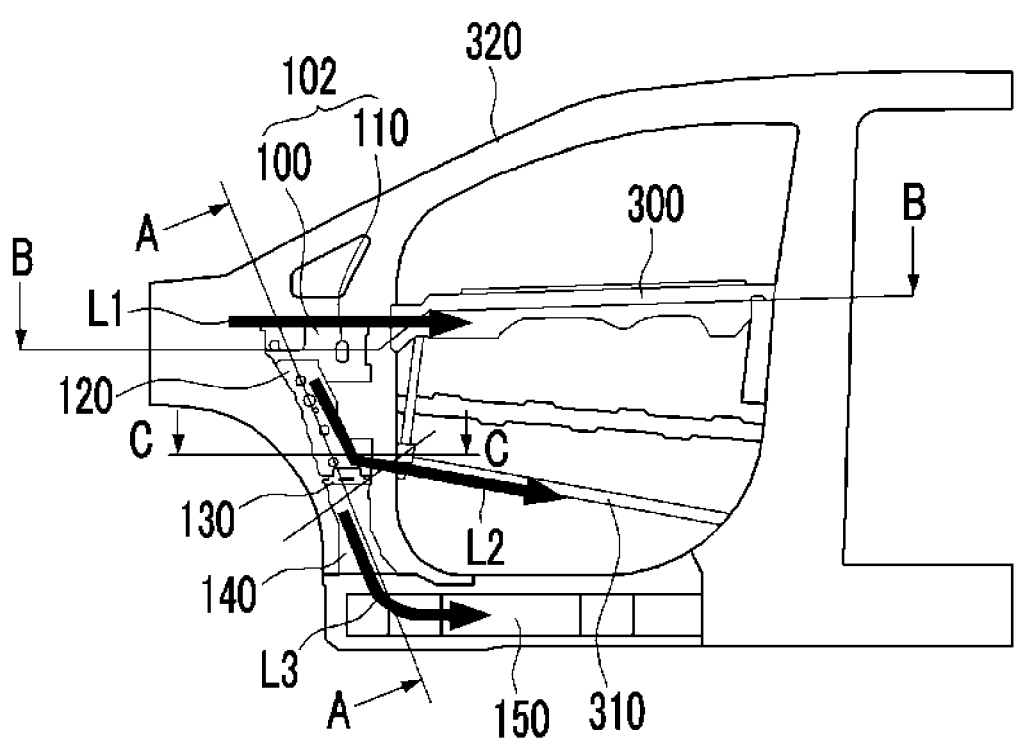
FIG. 3 is a side view showing a portion of the inside of an exemplary vehicle body having an exemplary reinforcement structure according to the present invention.

FIG. 3 is a side view showing a portion of the inside of the vehicle body having a reinforcement structure according to various embodiments of the present invention. Referring to FIG. 3, a door belt line 300 forming a window part at the upper portion is formed at a door of a vehicle body 320 and the door upper hinge bracket is formed at a height corresponding to the door belt line 300.

Accordingly, in a front collision of a vehicle, the shock transmitted to the door upper hinge box 102 is distributed to the door belt line 300 along the line L1, such that the performance against an offset collision and a small overlap collision can be improved.

Further, door beam 310 is disposed in the front-rear direction inside a door of the vehicle body 320, the front end of the door beam 310 is disposed at a position corresponding to the joint of the reinforcement bracket 120 and the bulk head 130, and the shock energy transmitted to the reinforcement bracket 120 and the bulk head 130 is distributed to the door beam 310 along the line L2, such that the performance against an offset collision and a small overlap collision can be improved.

Further, the shock energy transmitted to the reinforcement bracket 120, the bulk head, and the door lower hinge reinforcement plate 140 is distributed to the side seal 150 along the line L3, such that the performance against an offset collision and a small overlap collision can be improved.

Figure 4:
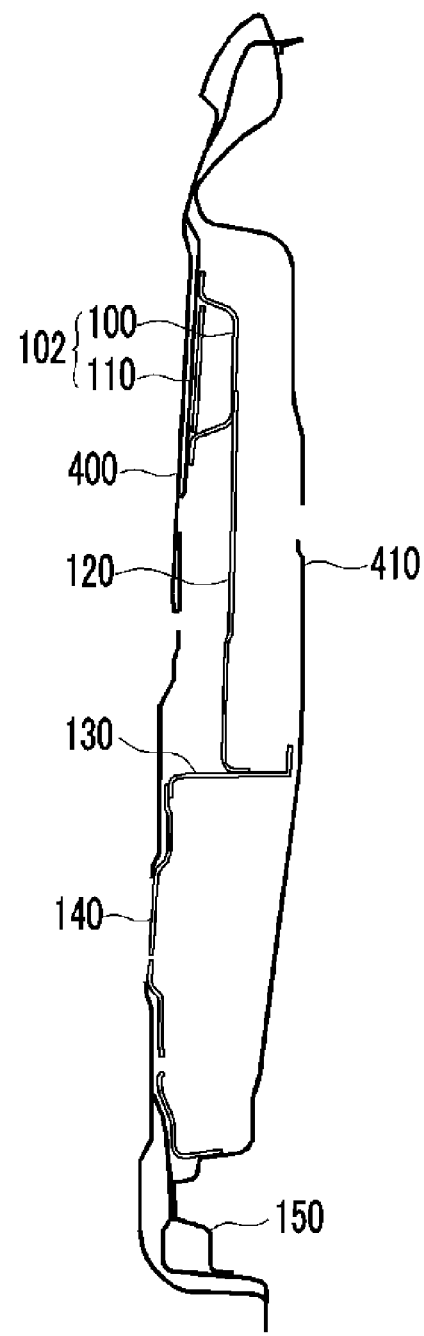
FIG. 4 is a cross-sectional view taken along line A-A of FIG. 3.

FIG. 4 is a cross-sectional view taken along line A-A of FIG. 3, according to various embodiments of the present invention. Referring to FIG. 4, the vehicle body includes a side outer panel 400 disposed on the outer side and a side inner panel 410 disposed on the inner side at a predetermined distance from the side outer panel 400, and the door upper hinge box 102, the reinforcement bracket 120, the bulk head 130, and the door lower hinge reinforcement plate 140 are disposed between the side outer panel 400 and the side inner panel 410.

The side seal 150 is disposed at the lower portions of the side outer panel 400 and the side inner panel 410. The door upper hinge reinforcement plate 100 of the door upper hinge box is attached to the side outer panel 300 and the door upper hinge bracket 110 is attached to the door upper hinge reinforcement plate 100 and the side outer panel 400.

The upper end of the reinforcement bracket 120 is attached to the inner side of the door upper hinge reinforcement plate 100 and the lower end is attached to the center of the upper surface of the bulk head 130. Further, the outer end of the bulk head 130 is attached to the inner side of the side outer panel 400 and the inner end of the bulk head 130 is attached to the outer side of the side inner panel 410.

The upper end of the door lower hinge reinforcement plate 140 is attached to the outer end of the bulk head 130 and the lower end is attached to the side seal 150. The door lower hinge reinforcement plate 140 may have a shape fitting to the inner side of the side outer panel 400.

Figure 5:
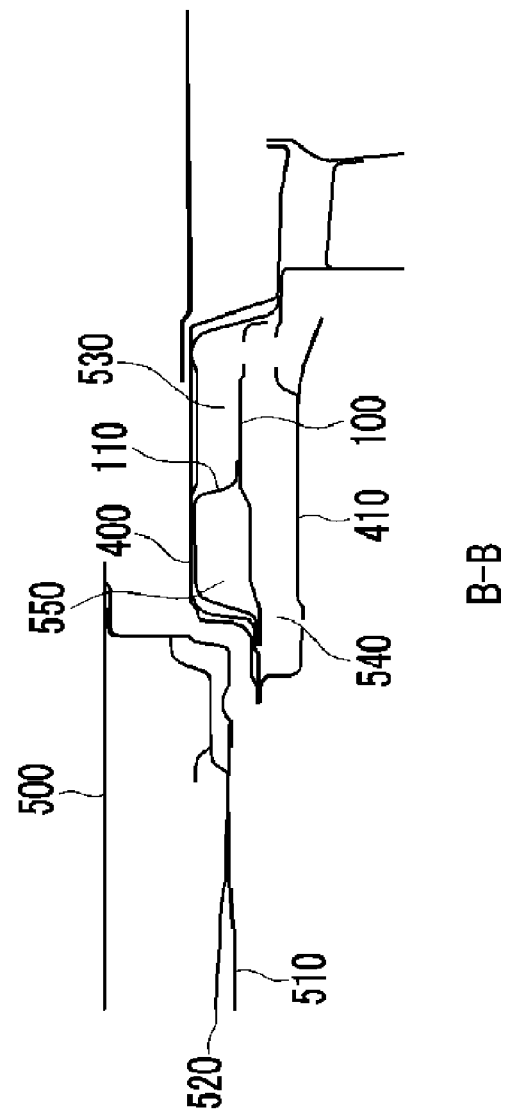
FIG. 5 is a cross-sectional view taken along line B-B of FIG. 3.

FIG. 5 is a cross-sectional view taken along line B-B of FIG. 3, according to various embodiments of the present invention. Referring to FIG. 5, a door includes a door outer panel 500 and a door inner panel 510, a door reinforcement plate 520 is disposed between the door outer panel 500 and the door inner panel 510, and a portion of the door reinforcement plate 520 is attached to the door inner panel 510. The door reinforcement plate 520, a part forming the door belt line 300, absorbs and distributes shock energy from the door upper hinge box 102.

As shown in the figures, the door upper hinge bracket 110 is attached to the inner side of the side outer panel 400, and the door upper hinge reinforcement plate 100 is attached to door upper hinge bracket 110, with the front end and the rear end attached and fixed to the side outer panel 400 and the side inner panel 410.

A first cross-sectional area 530 and a second cross-sectional area 540 are formed by the door upper hinge reinforcement plate 100 between the side outer panel 400 and the side inner panel 410, and a third cross-sectional area 550 is formed between the door upper hinge reinforcement plate 100 and the door upper hinge bracket 110, in the first cross-sectional area 530.

Figure 6:
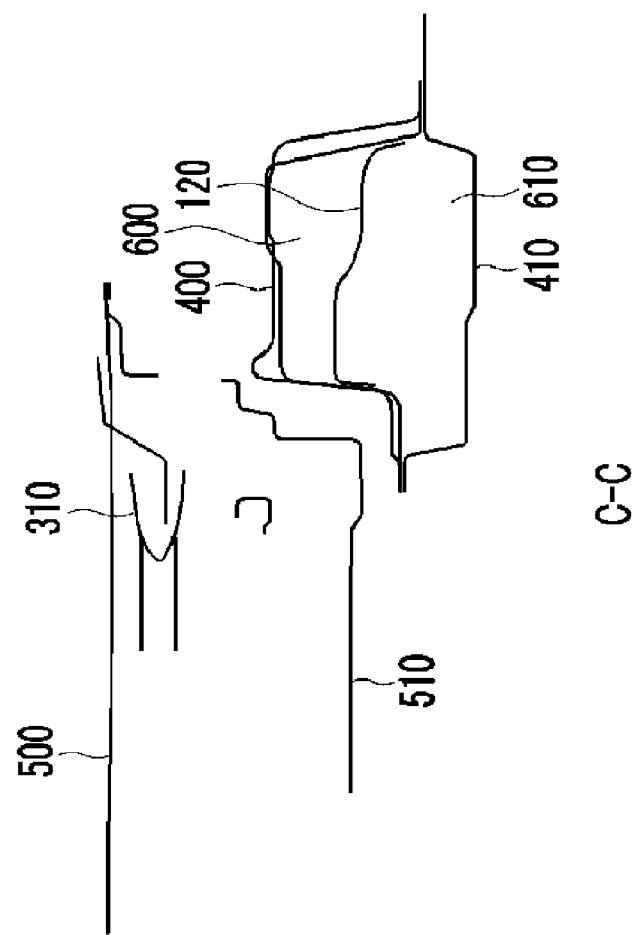
FIG. 6 is a cross-sectional view taken along line C-C of FIG. 3.

FIG. 6 is a cross-sectional view taken along line C-C of FIG. 3, according to various embodiments of the present invention. Referring to FIG. 6, the door includes the door outer panel 500 and the door inner panel 510, the door beam 310 is disposed between the door outer panel 500 and the door inner panel 510, the reinforcement bracket 120 is disposed between the side outer panel 400 and the side inner panel 410, and the front end of the door beam 310 corresponds to the position of the reinforcement bracket 120.

The reinforcement bracket 120 is attached to the side outer panel 400 such that the cross-section formed by the side outer panel 400 and the side inner panel 410 is divided into an outer cross-sectional area 600 and an inner cross-sectional area 610.

For convenience in explanation and accurate definition in the appended claims, the terms "upper" or "lower", "front" or "rear", "inner" or "outer", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present inven-

What is claimed is:

1. A vehicle body having a reinforcement structure, comprising:
   a side outer panel disposed on an outer side of the vehicle body;
   a side inner panel disposed on an inner side of the vehicle body at a predetermined distance from the side outer panel;
   a door hinge box attached to an upper portion of an inner side of the side inner panel;
   a door lower hinge reinforcement plate attached to a lower portion of the inner side of the side inner panel, vertically at a predetermined distance from the door hinge box;
   a bulk head attached to an upper end of the door lower reinforcement plate, with one end attached to an inner side of the side outer panel and the other end attached to an outer side of the side inner panel; and
   a reinforcement bracket disposed in an up-down direction to connect the door hinge box and the bulk head.

2. The vehicle body of claim 1, wherein the door hinge box includes:
   a door upper hinge bracket attached to the inner side of the outer panel; and
   a door upper hinge reinforcement plate with one end attached to an upper end of the reinforcement bracket and the other end attached to the door upper hinge bracket.

3. The vehicle body of claim 1, further comprising:
   a door hinged to the door hinge box; and
   a door beam disposed in a front-rear direction inside the door and prevents deformation of the door,
   wherein a front end of the door beam is disposed at a position corresponding to a joint of the reinforcement bracket and the bulk head.

4. The vehicle body of claim 1, wherein the door lower hinge reinforcement plate has a shape corresponding to the inner side of the outer panel.

5. The vehicle body of claim 1, wherein a lower end of the reinforcement bracket is attached and fixed to a center of an upper surface of the bulk head.

6. The vehicle body of claim 1, further comprising:
   a side seal disposed in a front-rear direction on a lower part of the vehicle body, wherein a lower end of the door lower hinge reinforcement plate is attached to the side seal.

* * * * *